United States Patent
Dantkale et al.

(10) Patent No.: US 10,264,064 B1
(45) Date of Patent: Apr. 16, 2019

(54) SYSTEMS AND METHODS FOR PERFORMING DATA REPLICATION IN DISTRIBUTED CLUSTER ENVIRONMENTS

(71) Applicant: Veritas Technologies LLC, Mountain View, CA (US)

(72) Inventors: Suhas Dantkale, Sunnyvale, CA (US); Christopher Uhler, Palo Alto, CA (US); Chaitanya Yalamanchili, Santa Clara, CA (US); Rakesh Ranjan, Cupertino, CA (US); Satyendra Thakur, San Jose, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 349 days.

(21) Appl. No.: 15/177,454

(22) Filed: Jun. 9, 2016

(51) Int. Cl.
  *G06F 15/173* (2006.01)
  *H04L 29/08* (2006.01)
  *H04L 12/911* (2013.01)

(52) U.S. Cl.
  CPC ........ *H04L 67/1029* (2013.01); *H04L 47/783* (2013.01); *H04L 67/1095* (2013.01)

(58) Field of Classification Search
  CPC .............. H04L 67/1029; H04L 47/783; H04L 67/1095
  USPC ................. 709/226, 232, 223, 248
  See application file for complete search history.

(56) References Cited

U.S. PATENT DOCUMENTS

| | | | | |
|---|---|---|---|---|
| 8,959,509 B1 * | 2/2015 | Sobel | ................. | G06F 9/4843 718/1 |
| 2014/0026133 A1 * | 1/2014 | Parker | ................. | G06F 9/5083 718/1 |
| 2014/0068045 A1 * | 3/2014 | Tarui | ................. | H04L 41/02 709/223 |
| 2015/0095443 A1 * | 4/2015 | Yang | ................. | H04L 67/1095 709/212 |
| 2015/0095795 A1 * | 4/2015 | Zhang | ................. | G06F 3/0484 715/748 |
| 2016/0070623 A1 * | 3/2016 | Derk | ................. | G06F 11/1469 714/6.23 |
| 2016/0371153 A1 * | 12/2016 | Dornemann | ........ | G06F 11/1458 |
| 2017/0147399 A1 * | 5/2017 | Cropper | ................. | G06F 9/4856 |
| 2018/0075166 A1 * | 3/2018 | Pawar | ................. | G06F 17/3007 |

* cited by examiner

*Primary Examiner* — Liang Che A Wang
*Assistant Examiner* — Kaylee J Huang
(74) *Attorney, Agent, or Firm* — FisherBroyles, LLP

(57) ABSTRACT

The disclosed computer-implemented method for performing data replication in distributed cluster environments may include (1) identifying a distributed cluster environment that includes (A) a plurality of compute nodes that execute a plurality of virtual machines and (B) a data node that stores data that has been replicated from storage devices used by the virtual machines, (2) determining, at the data node, storage-utilization totals for the virtual machines that represent amounts of storage space on the storage devices used by the virtual machines, (3) identifying, based at least in part on the storage-utilization totals, a virtual machine whose storage-utilization total is highest among the plurality of virtual machines, (4) prioritizing the virtual machine and then in response to the prioritization, (5) directing the compute node to initiate a data replication process with the data node in connection with the virtual machine. Various other methods, systems, and computer-readable media are also disclosed.

16 Claims, 6 Drawing Sheets

SYSTEMS AND METHODS FOR PERFORMING DATA REPLICATION IN DISTRIBUTED CLUSTER ENVIRONMENTS

BACKGROUND

Distributed cluster environments often include compute nodes that execute applications and data nodes that replicate data from the compute nodes. For example, an OpenFlame Compute cluster may include various compute nodes that execute applications independently of one another. In this example, the compute nodes may replicate data to the data node to facilitate local storage reclamation, performance increases, and/or data restoration. These compute nodes may write and/or replicate data to the data node at different speeds. As a result, the data node may end up dedicating more resources and/or time to fulfilling the needs of some compute nodes and less resources and/or time to fulfilling the needs of others.

Unfortunately, the needs of some compute nodes may be more urgent and/or have higher priority than others. In traditional distributed cluster environments, the compute nodes may be responsible for scheduling, initiating, and/or performing their own data replication processes with the data node. Despite some compute nodes having more urgent replication needs than others, these compute nodes may be unable to communicate their needs and/or priorities to one another in traditional distributed cluster environments. As a result, these compute nodes may be unable to coordinate any type of priority-based scheduling of data replication processes with one another.

As an example, an OpenFlame Compute cluster may include a compute node that executes a first virtual machine. In this example, data used by the first virtual machine may be currently consuming approximately 80% of the storage space on the compute node's Solid-State Drive (SSD). This OpenFlame Compute cluster may also include another compute node that executes a second virtual machine. In this example, data used by the other virtual machine may be currently consuming approximately 10% of the storage space on the other compute node's SSD.

Unfortunately, in the event that the data used by one of these virtual machines fills up the corresponding SSD to capacity, that SSD may experience a storage overflow, thereby potentially causing data corruption, Service-Level Agreement (SLA) violations, and/or application downtime. In view of this possibility, the first virtual machine whose data is consuming approximately 80% of its SSD may have a greater need to perform data replication with the data node than the second virtual machine whose data is consuming only approximately 10% of its SSD. Nevertheless, traditional distributed cluster environments may fail to provide any means for coordinating and/or performing such priority-based scheduling of data replication processes.

The instant disclosure, therefore, identifies and addresses a need for improved systems and methods for performing data replication in distributed cluster environments.

SUMMARY

As will be described in greater detail below, the instant disclosure describes various systems and methods for performing data replication in distributed cluster environments by enabling the data node to collect priority-related information about virtual machines running in such environments and then schedule and/or direct the data replication processes based at least in part with their respective needs.

In one example, a system for performing data replication in distributed cluster environments may include several modules stored in memory, including (1) an identification module, stored in memory, that identifies a distributed cluster environment that includes (A) a plurality of compute nodes that execute a plurality of virtual machines and (B) at least one data node that stores data that has been replicated from storage devices used by the virtual machines, (2) a determination module, stored in memory, that determines storage-utilization totals for the virtual machines that represent amounts of storage space on the storage devices used by the virtual machines, (3) wherein the identification module further identifies, based at least in part on the storage-utilization totals, a virtual machine whose storage-utilization total is highest among the plurality of virtual machines, (4) a scheduling module, stored in memory, that (A) prioritizes the virtual machine with the highest storage-utilization total among the plurality of virtual machines and (B) directs, in response to the prioritization, the compute node that executes the virtual machine with the highest storage-utilization total to initiate a data replication process with the data node in connection with the virtual machine, and (5) at least one physical processor that executes the identification module, the determination module, and the scheduling module.

In one example, the system may also include a collection module that collects, from the virtual machines, statistics that identify the storage-utilization totals used by the virtual machines. In this example, the collection module may further calculate the storage-utilization totals for the virtual machines based at least in part on the statistics collected from the virtual machines.

In one example, the scheduling module may also schedule a plurality of data replication processes for the virtual machines in order of highest storage-utilization total to lowest storage-utilization total among the virtual machines. Additionally or alternatively, the scheduling module may direct the compute nodes to initiate the data replication processes as scheduled in the order of highest storage-utilization total to lowest storage-utilization total. Moreover, the scheduling module may direct, upon completion of the data replication process, another compute node to initiate another data replication process with the data node in connection with another virtual machine running on the other compute node.

In one example, the scheduling module may enable the compute node to reclaim storage space on one of the storage devices previously occupied by data that has been replicated to the data node during the data replication process. In another example, the identification module may also identify a transfer-rate total that represents a sum of all data replication processes being performed by the plurality of compute nodes on the data node. In this example, the determination module may determine that the transfer-rate total exceeds a certain threshold. Additionally or alternatively, the scheduling module may direct, in response to this determination, the compute node that executes the virtual machine with the highest storage-utilization total to initiate an aggressive data replication job that involves multiple compute nodes contributing to the data replication process.

In one example, the threshold exceeded by the transfer-rate total may include and/or represent the maximum write speed of the data node. In this example, the scheduling module may direct the compute node that executes the virtual machine with the highest storage-utilization total to perform the aggressive data replication job in conjunction with another compute node that is storing a reflected copy of the data implicated in the aggressive data replication job.

Additionally or alternatively, the scheduling module may interrupt another data replication process in progress to enable the compute node and the other compute node to perform the aggressive data replication job.

In one example, the aggressive data replication job may involve replicating multiple virtual disks to the data node. In this example, the scheduling module may direct the compute node to replicate one of the multiple virtual disks to the data node and/or distribute at least one task to the other compute node that causes the other compute node to replicate another one of the multiple virtual disks to the data node such that the compute node and the other compute node are replicating the multiple virtual disks to the data node simultaneously.

In one example, the scheduling module may enable the compute node to reclaim storage space on a plurality of the storage devices previously occupied by data that has been replicated to the data node during the aggressive replication job. In some examples, the storage devices may include and/or represent SSDs.

As another example, a method for performing data replication in distributed cluster environments may include (1) identifying a distributed cluster environment that includes (A) a plurality of compute nodes that execute a plurality of virtual machines and (B) at least one data node that stores data that has been replicated from storage devices used by the virtual machines, (2) determining, at the data node, storage-utilization totals for the virtual machines that represent amounts of storage space on the storage devices used by the virtual machines, (3) identifying, based at least in part on the storage-utilization totals, a virtual machine whose storage-utilization total is highest among the plurality of virtual machines, (4) prioritizing the virtual machine with the highest storage-utilization total among the plurality of virtual machines, and then in response to the prioritization, (5) directing the compute node that executes the virtual machine with the highest storage-utilization total to initiate a data replication process with the data node in connection with the virtual machine.

In a further example, the above-described method may be encoded as computer-readable instructions on a non-transitory computer-readable medium. For example, a computer-readable medium may include one or more computer-executable instructions that, when executed by at least one processor of a computing device, cause the computing device to (1) identify a distributed cluster environment that includes (A) a plurality of compute nodes that execute a plurality of virtual machines and (B) at least one data node that stores data that has been replicated from storage devices used by the virtual machines, (2) determine, at the data node, storage-utilization totals for the virtual machines that represent amounts of storage space on the storage devices used by the virtual machines, (3) identify, based at least in part on the storage-utilization totals, a virtual machine whose storage-utilization total is highest among the plurality of virtual machines, (4) prioritize the virtual machine with the highest storage-utilization total among the plurality of virtual machines, and then in response to the prioritization, (5) direct the compute node that executes the virtual machine with the highest storage-utilization total to initiate a data replication process with the data node in connection with the virtual machine.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
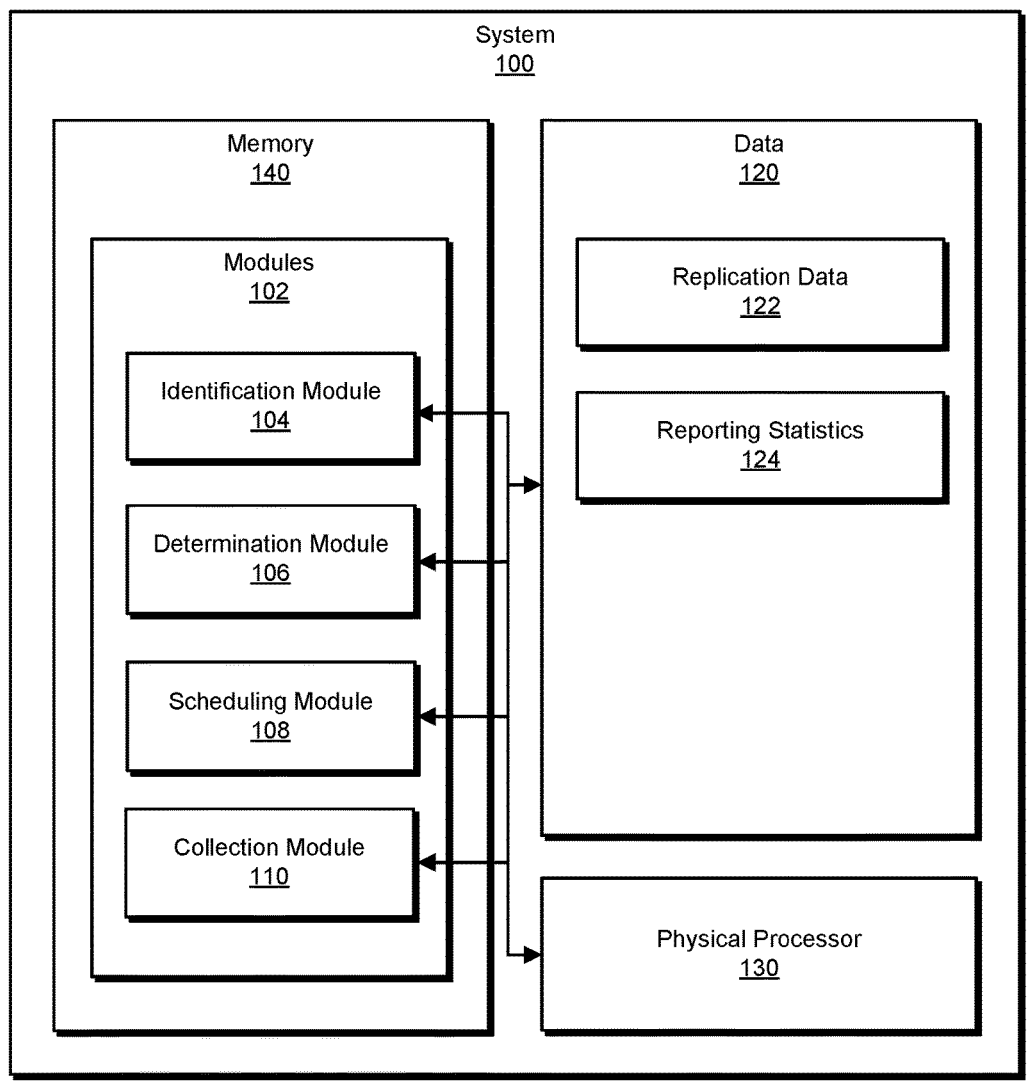
FIG. 1 is a block diagram of an example system for performing data replication in distributed cluster environments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing data replication in distributed cluster environments. As will be explained in greater detail below, by collecting statistics that identify storage-utilization totals used by virtual machines within a distributed cluster environment, the systems and methods described herein may be able to determine which of the virtual machines has the greatest need for data replication. These systems and methods may prioritize the virtual machines based at least in part on their data replication needs and then schedule and/or initiate data replication processes in order of highest storage-utilization total to lowest storage-utilization total.

By prioritizing, scheduling, and/or initiating the data replication processes in this way, these systems and methods may prevent SSDs storing data used by the virtual machines from filling up and/or overflowing. In doing so, these systems and methods may mitigate and/or eliminate data corruption, SLA violations, and/or application downtime committed and/or experienced by the virtual machines. Accordingly, these systems and methods may enable the compute nodes and/or data nodes to achieve greater performance and/or reliability. Similarly, these systems and methods may improve the field of distributed cluster environments and/or data replication systems by coordinating the efforts and/or resources of the compute nodes to perform data replication in accordance with the respective needs and/or priorities of their virtual machines.

Figure 2:
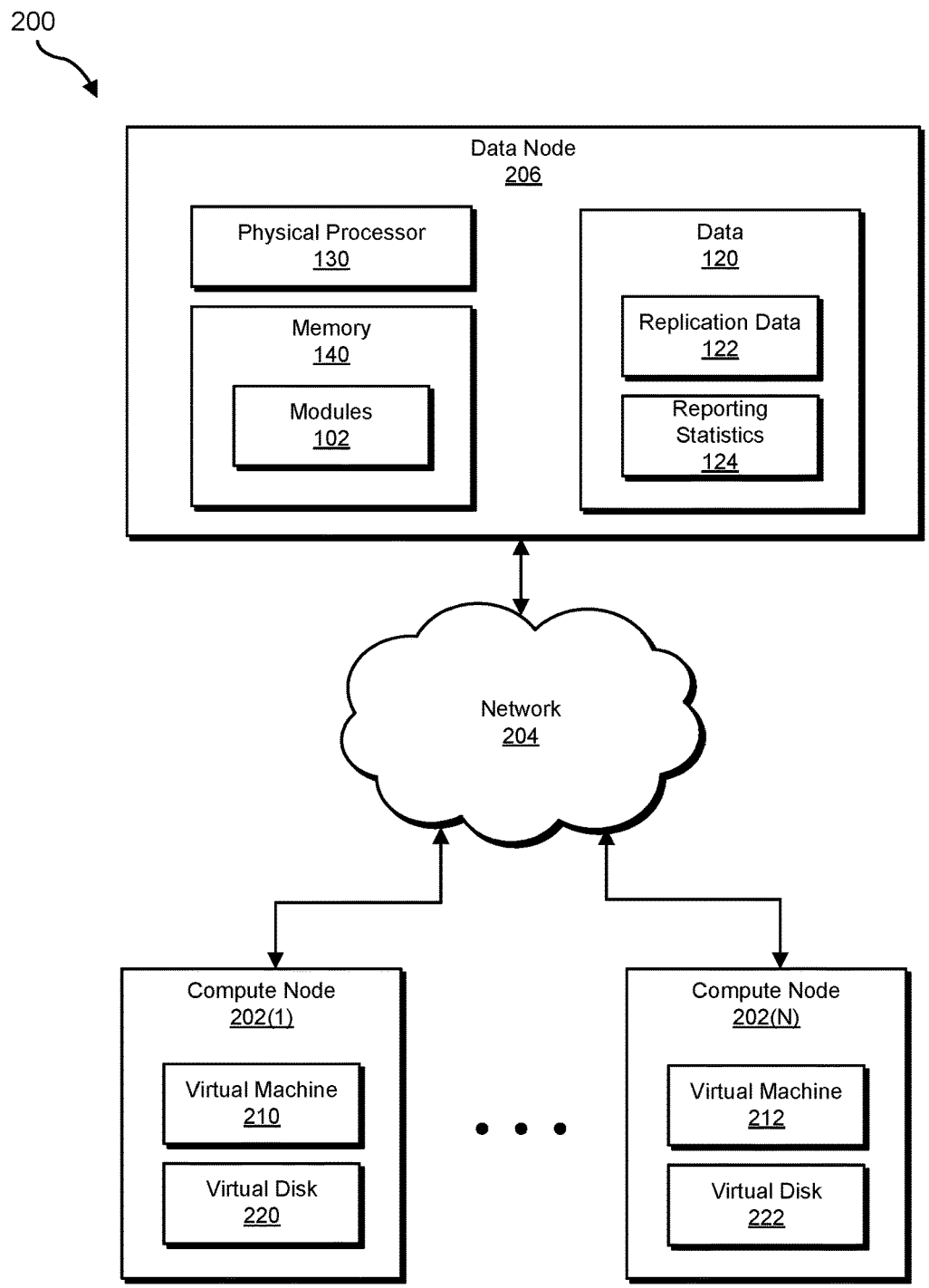
FIG. 2 is a block diagram of an additional example system for performing data replication in distributed cluster environments.
Figure 3:
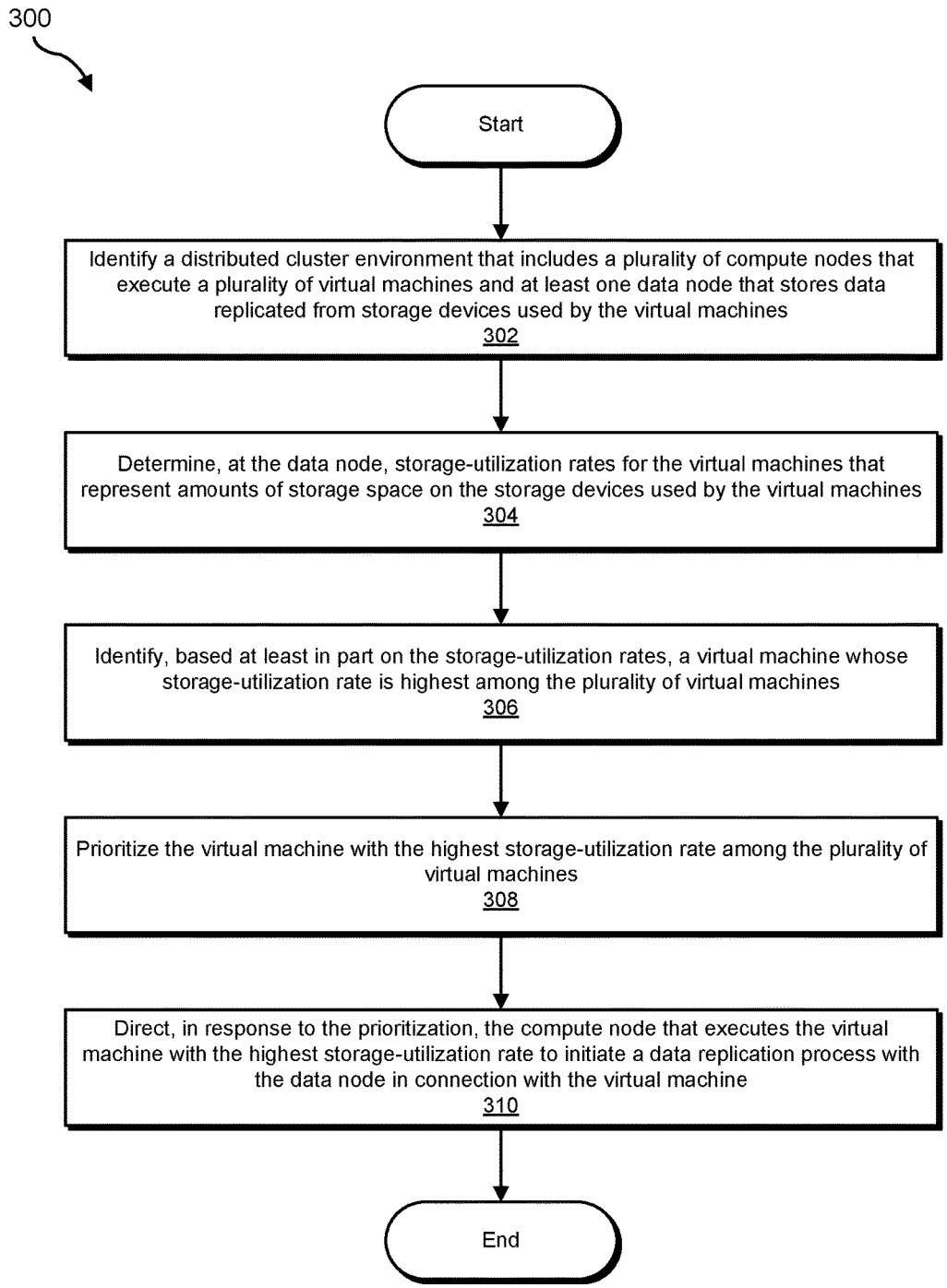
FIG. 3 is a flow diagram of an example method for performing data replication in distributed cluster environments.
Figure 4:
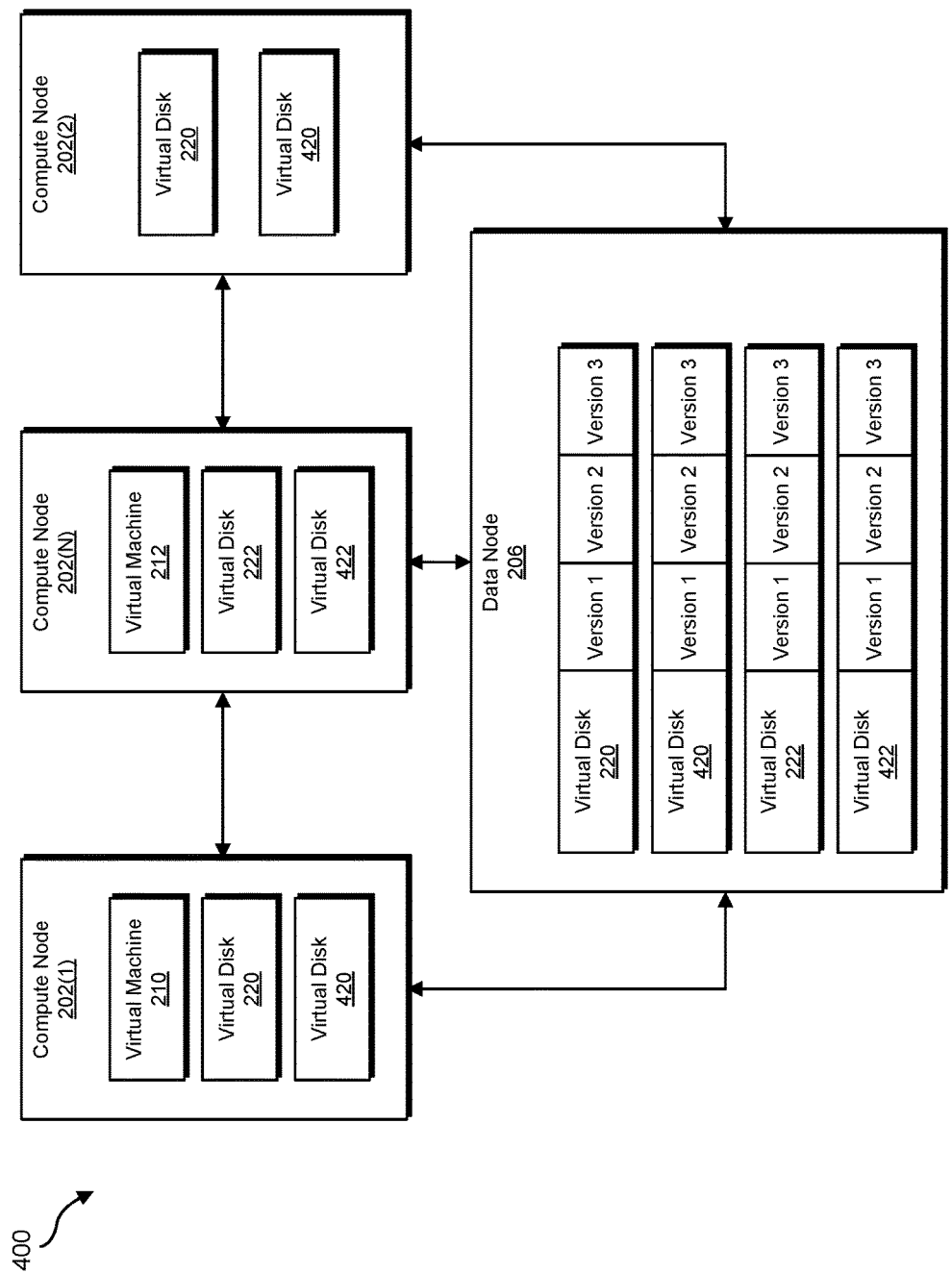
FIG. 4 is a block diagram of an additional example system for performing data replication in distributed cluster environments.

The following will provide, with reference to FIGS. 1, 2, and 4, detailed descriptions of example systems for performing data replication in distributed cluster environments. Detailed descriptions of corresponding computer-implemented methods will be provided in connection with FIG. 3. In addition, detailed descriptions of timing diagrams will be provided in connection with FIGS. 5 and 6.

FIG. 1 is a block diagram of an example system 100 for performing data replication in distributed cluster environments. As illustrated in this figure, example system 100 may include one or more modules 102 for performing one or more tasks. As will be explained in greater detail below, modules 102 may include an identification module 104, a determination module 106, a scheduling module 108, and a collection module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., compute nodes 202(1)-(N) and/or data node 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing data replication in distributed cluster environments. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include various data, such as data 120. As illustrated in FIG. 1, data 120 may include and/or represent replication data 122 and/or reporting statistics 124. Replication data 122 generally represents any type or form of data that is used, created, accessed, and/or stored by a compute node and then replicated to a data node within a distributed cluster environment. In one example, replication data 122 may include and/or represent application data (e.g., a virtual disk) that is used and/or created by a virtual machine running on a compute node within a distributed cluster environment. In this example, replication data 122 may include and/or represent certain versions of application data (e.g., different versions or updates of a virtual disk).

Reporting statistics 124 generally represent any type or form of data and/or statistics that identify usage, consumption, and/or identification information about a virtual machine and/or an SSD that stores the virtual machine's data on a compute node within a distributed cluster environment. In one example, reporting statistics 124 may identify the amount of storage space on an SSD that is utilized, consumed, and/or occupied by data belonging and/or corresponding to a virtual machine running on a compute node within a distributed cluster environment.

Example system 100 in FIG. 1 may be implemented in a variety of ways. For example, all or a portion of example system 100 may represent portions of example system 200 in FIG. 2. As shown in FIG. 2, system 200 may include compute nodes 202(1)-(N) in communication with a data node 206 via a network 204. In one example, all or a portion of the functionality of modules 102 may be performed by one or more of compute nodes 202(1)-(N), data node 206, and/or any other suitable computing system.

In one example, compute nodes 202(1)-(N) may include and/or execute certain applications. For example, compute node 202(1) may include and/or execute a virtual machine 210, and compute node 202(N) may include and/or execute a virtual machine 212. Additionally or alternatively, compute node 202(1) may include and/or store a virtual disk 220 that contains and/or represents data used by virtual machine 210, and compute node 202(N) may include and/or store a virtual disk 222 that contains and/or represents data used by virtual machine 212.

As will be described in greater detail below, one or more of modules 102 from FIG. 1 may, when executed by at least one processor of compute nodes 202(1)-(N) and/or data node 206, enable compute nodes 202(1)-(N) and/or data node 206 to (1) identify a distributed cluster environment that includes (A) a plurality of compute nodes 202(1)-(N) that execute at least virtual machines 210 and 212 and (B) data node 206 that stores replication data 122 that has been replicated from storage devices used by virtual machines 210 and 212, (2) determine, at data node 206, storage-utilization totals for virtual machines 210 and 212 that represent amounts of storage space on the storage devices used by virtual machines 210 and 212, (3) identify, based at least in part on the storage-utilization totals, which of virtual machines 210 and 212 has the highest storage-utilization total, (4) prioritize the virtual machine with the highest storage-utilization total and then in response to the prioritization, (5) direct the compute node that executes the virtual machine with the highest storage-utilization total to initiate a data replication process with data node 206 in connection with that virtual machine.

Compute nodes 202(1)-(N) each generally represent any type or form of computing device capable of reading computer-executable instructions. In one example, compute nodes 202(1)-(N) may constitute and/or represent at least a portion of the compute plane within a distributed cluster environment. Examples of compute nodes 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Data node 206 generally represents any type or form of computing device that is capable of storing, replicating, backing up, and/or restoring data in connection with compute nodes within a distributed cluster environment. In one example, data node 206 may constitute and/or represent at least a portion of the data plane within a distributed cluster environment. Examples of data node 206 include, without limitation, storage servers, database servers, application servers, and/or web servers configured to run certain software applications and/or provide various storage, database, and/or web services. Although illustrated as a single entity in FIG. 2, data node 206 may include and/or represent a plurality of data nodes that work and/or operate in conjunction with one another.

Network 204 generally represents any medium or architecture capable of facilitating communication or data transfer. In one example, network 204 may facilitate communication among compute nodes 202(1)-(N) and data node 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Virtual machines 210 and 212 each generally represent any operating system environment and/or application that is abstracted from computing hardware by a virtual machine manager (such as a hypervisor). Although FIG. 2 illustrates only a single virtual machine running on each of compute nodes 202(1)-(N), alternative embodiments may include and/or involve multiple virtual machines running on each of compute nodes 202(1)-(N).

Virtual disks 220 and 222 each generally represent any virtual and/or logical volume or device that emulates, operates as, and/or appears as a single physical volume and/or device. In some examples, virtual disk 220 may occupy and/or be stored on one or more storage devices (e.g., SSDs, backing stores, and/or hard disks) of compute node 202(1). Additionally or alternatively, virtual disk 222 may occupy and/or be stored on one or more storage devices (e.g., SSDs, backing stores, and/or hard disks) of compute node 202(N). Although FIG. 2 illustrates only a single virtual disk stored on each of compute nodes 202(1)-(N), alternative embodiments may include and/or involve multiple virtual disks stored on each of compute nodes 202(1)-(N).

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for performing data replication in distributed cluster environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a distributed cluster environment that includes a plurality of compute nodes and at least one data node. For example, identification module 104 may, as part of data node 2in FIG. 2, identify a distributed cluster environment that includes compute nodes 202(1)-(N) and data node 206. In this example, compute nodes 202(1)-(N) may execute virtual machines 210 and 212. Additionally or alternatively, data node 206 may store data that has been replicated from storage devices used by virtual machines 210 and 212. These storage devices may include and/or represent SSDs located on compute nodes 202(1)-(N).

The systems described herein may perform step 302 in a variety of ways and/or contexts. In some examples, identification module 104 may identify portions of the distributed cluster environment during installation, setup, and/or configuration. In one example, identification module 104 may identify compute node 202(1)) as compute node 202(1) is added to and/or joins the distributed cluster environment. Additionally or alternatively, identification module 104 may identify compute node 202(N) as compute node 202(N) is added to and/or joins the distributed cluster environment. For example, identification module 104 may identify compute nodes 202(1)-(N) based at least in part on communications with compute nodes 202(1)-(N) during installation, setup, and/or configuration of compute nodes 202(1)-(N).

In one example, identification module 104 may identify data node 206 as a replication target for compute nodes 202(1)-(N) within the distributed cluster environment during installation, setup, and/or configuration. For example, identification module 104 may identify data node 206 as the replication target based at least in part on communications with compute nodes 202(1)-(N) during installation, setup, and/or configuration of data node 206.

In some examples, identification module 104 may identify portions of the distributed cluster environment based at least in part on a configuration file that includes information about the distributed cluster environment. For example, identification module 104 may locate a configuration file for the distributed cluster environment on data node 206 and then search the configuration file for any information specific and/or relating to the configuration, setup, and/or makeup of the distributed cluster environment.

Returning to FIG. 3, at step 304 one or more of the systems described herein may determine storage-utilization totals for the virtual machines that represent amounts of storage space on the storage devices used by the virtual machines. For example, determination module 106 may, as part of data node 206, determine storage-utilization totals for virtual machines 210 and 212. In this example, the storage-utilization totals may represent amounts of storage space on the storage devices used by virtual machines 210 and 212.

The systems described herein may perform step 304 in a variety of ways and/or contexts. In some examples, determination module 106 may determine the storage-utilization totals for virtual machines 210 and 212 based at least in part on reporting statistics 124. For example, collection module 110 may, as part of data node 206, collect reporting statistics 124 that identify the storage-utilization totals used by virtual machines 210 and 212. In this example, compute nodes 202(1)-(N) may be configured to periodically and/or regularly (e.g., every 15, 30, or 60 seconds) send reporting statistics 124 to data node 206.

In one example, determination module 106 may calculate the storage-utilization totals from reporting statistics 124. Additionally or alternatively, determination module 106 may search reporting statistics 124 for any information that identifies the storage-utilization totals for virtual machines 210 and 212.

As a specific example, reporting statistics 124 may include and/or identify various information specific and/or relating to a particular virtual machine and/or compute node. Examples of such information include, without limitation, the virtual machine whose statistics are being reported (e.g., virtual machine 210 or 212), the compute node (e.g., compute node 202(1)) or 202(N)) that is executing the virtual machine in question, the amount of storage space on the corresponding SSD that is being utilized by the virtual machine in question, the rate and/or speed at which the virtual machine in question is writing to the corresponding SSD, and/or all other virtual machines running on that particular compute node.

In one example, virtual disk 220 may include and/or represent data stored across at least one SSD and at least one backing store or hard disk on compute node 202(1)). In this example, the SSD may store the most current data that has yet to be moved and/or transferred to the backing store or hard disk on compute node 202(1)). This data may constitute and/or represent a log, layer, and/or version of virtual disk 220. Additionally or alternatively, this data may be replicated to data node 206 in the next and/or upcoming data replication process and/or data sync.

In doing so, this data replication process and/or data sync may enable compute node 202(1)) to reclaim storage space on the SSD that was previously occupied by that log, layer, and/or version of virtual disk 220. This log, layer, and/or version may include and/or represent a delta and/or differential of data within virtual disk 220. In other words, this log, layer, and/or version may include and/or represent any data that is newly added to and/or has been modified within virtual disk 220 since the last data replication process and/or data sync with data node 206.

In one example, virtual disk 222 may include and/or represent data stored across at least one SSD and at least one backing store or hard disk on compute node 202(N). In this example, the SSD may store the most current data that has yet to be moved and/or transferred to the backing store or hard disk on compute node 202(N). This data may constitute and/or represent a log, layer, and/or version of virtual disk 222. Additionally or alternatively, this data may be replicated to data node 206 in the next and/or upcoming data replication process and/or data sync.

In doing so, this data replication process and/or data sync may enable compute node 202(N) to reclaim storage space on the SSD that was previously occupied by that log, layer, and/or version of virtual disk 222. This log, layer, and/or version may include and/or represent a delta and/or differential of data within virtual disk 222. In other words, this log, layer, and/or version may include and/or represent any data that is newly added to and/or has been modified within virtual disk 222 since the last data replication process and/or data sync with data node 206.

Returning to FIG. 3, at step 306 one or more the systems described herein may identify a virtual machine whose storage-utilization total is highest among the plurality of virtual machines based at least in part on the storage-utilization totals. For example, identification module 104 may, as part of data node 206, identify virtual machine 210 as having the highest storage-utilization total among virtual machines 210 and 212 based at least in part on the storage-utilization totals. In other words, the data used by virtual machine 210 may occupy a higher percentage and/or a greater amount of storage space than the data used by virtual machine 212.

The systems described herein may perform step 306 in a variety of ways and/or contexts. In some examples, identification module 104 may identify the virtual machine with the highest storage-utilization total among virtual machines 210 and 212 by comparing the storage-utilization totals. For example, identification module 104 may compare the storage-utilization totals of virtual machines 210 and 212 with one another. Based on this comparison, identification module 104 may determine that the storage-utilization total for virtual machine 210 may be higher and/or greater than the storage-utilization total for virtual machine 212.

As a specific example, reporting statistics 124 may indicate that the data used by virtual machine 210 is occupying 70% of the SSD on compute node 202(1)). In this example, reporting statistics 124 may also indicate that the data used by virtual machine 210 is occupying only 20% of the SSD on compute node 202(N). By comparing the relative SSD percentages being consumed by data from virtual machines 210 and 212, identification module 104 may identify virtual machine 210 as having the highest storage-utilization total among virtual machines 210 and 212.

Returning to FIG. 3, at step 308 one or more of the systems described herein may prioritize the virtual machine with the highest storage-utilization total among the plurality of virtual machines. For example, scheduling module 108 may, as part of data node 206, prioritize virtual machine 210 over virtual machine 212 due at least in part to virtual machine 210 having a higher storage-utilization total than virtual machine 212. This prioritization may refer and/or relate to the order in which data used by virtual machines 210 and 212 is replicated to data node 206.

The systems described herein may perform step 308 in a variety of ways and/or contexts. In some examples, scheduling module 108 may prioritize virtual machine 210 over virtual machine 212 by scheduling data replication processes for virtual machines 210 and 212 in order of highest storage-utilization total to lowest storage-utilization total. For example, scheduling module 108 may schedule a data replication process for virtual machine 210 ahead of a data replication process for virtual machine 212. The data replication process for virtual machine 210 may involve copying and/or moving the data used by virtual machine 210 from the corresponding SSD on compute node 202(1)) to data node

206. Similarly, the data replication process for virtual machine 210 may involve copying and/or moving the data used by virtual machine 212 from the corresponding SSD on compute node 202(N) to data node 206.

Returning to FIG. 3, at step 310 one or more of the systems described herein may direct the compute node that executes the virtual machine with the highest storage-utilization total to initiate a data replication process with the data node in connection with the virtual machine. For example, scheduling module 108 may, as part of data node 206, direct compute node 202(1)) that executes virtual machine 210 to initiate a data replication process with data node 206 in connection with virtual machine 210. In this example, scheduling module 108 may initiate this directive to compute node 202(1)) in response to the prioritization of virtual machine 210 over virtual machine 212. By doing so, scheduling module 108 may ensure that compute node 202(1)) performs the data replication process in connection with virtual machine 210 before compute node 202(N) performs a data replication process in connection with virtual machine 212.

The systems described herein may perform step 310 in a variety of ways and/or contexts. In some examples, scheduling module 108 may direct compute nodes 202(1)-(N) to initiate data replication processes as scheduled in order of highest storage-utilization total to lowest storage-utilization total. For example, scheduling module 108 may direct compute node 202(1)) to initiate a data replication process with data node 206 in connection with virtual machine 210. In response to this directive, compute node 202(1)) may initiate and/or perform the data replication process by moving and/or copying a log, layer, and/or version of virtual disk 220 to data node 206. Once compute node 202(1)) has moved and/or copied this log, layer, and/or version of virtual disk 220 to data node 206 in this way, compute node 202(1)) may reclaim the storage space previously occupied by this log, layer, and/or version of virtual disk 220 by way of a garbage collection process.

Upon completion of this data replication process, scheduling module 108 may direct compute node 202(N) to initiate a data replication process with data node 206 in connection with virtual machine 212. In response to this directive, compute node 202(N) may initiate and/or perform the data replication process by moving and/or copying a log, layer, and/or version of virtual disk 222 to data node 206. Once compute node 202(N) has moved and/or copied this log, layer, and/or version of virtual disk 222 to data node 206 in this way, compute node 202(N) may reclaim the storage space previously occupied by this log, layer, and/or version of virtual disk 222 by way of a garbage collection process.

In some examples, a data replication process may be elevated and/or increased to achieve data replication more aggressively and/or rapidly. In one example, a data replication process may be elevated and/or increased to an aggressive data replication job in the event that the storage-utilization total for a virtual machine reaches and/or exceeds a certain threshold. Additionally or alternatively, a data replication process may be elevated and/or increased to an aggressive data replication job in the event that a transfer-rate total exceeds a certain threshold. The transfer-rate total may represent the sum of all the transfer rates of data replication processes being performed on the data node at any point in time, and the certain threshold may represent the maximum write speed of the data node. As an example, scheduling module 108 may direct compute node 202(1)) to elevate and/or increase a data replication process in progress to an aggressive data replication job.

In other examples, an aggressive data replication job may supersede and/or interrupt another data replication process in progress. For example, compute node 202(1)) may be performing a data replication process with data node 206 in connection with virtual machine 210. While compute node 202(1)) is performing this data replication process, determination module 106 may detect a trigger that initiates an aggressive data replication job for virtual machine 212 running on compute node 202(N). In response to this trigger, scheduling module 108 may interrupt the data replication process being performed by compute node 202(1)) by directing compute node 202(N) to initiate an aggressive data replication job that supersedes and/or takes precedence over the data replication process.

FIG. 4 is a block diagram of an example distributed cluster environment 400. As illustrated in FIG. 4, distributed cluster environment 400 may include compute nodes 202(1)), 202(2), and 202(N) in communication with data node 206. In this example, compute node 202(1)) may include virtual machine 210 that stores and/or maintains data in virtual disks 220 and 420. Similarly, compute node 202(N) may include virtual machine 212 that stores and/or maintains data in virtual disks 220 and 420. In addition, compute node 202(2) may include and/or store reflected and/or mirrored copies of virtual disks 220 and 420 from compute node 202(1)). These reflected and/or mirrored copies may facilitate and/or support aggressive data replication jobs in connection with virtual disks 220 and 420 such that both compute nodes 202(1)) and 202(2) are able to perform data replication of virtual disks 220 and 420 in unison.

As illustrated in FIG. 4, data node 206 may include, store, and/or replicate virtual disks 220, 420, 222, and 422. In this example, virtual disks 220, 420, 222, and 422 replicated on data node 206 may each include and/or contain various versions. For example, virtual disks 220, 420, 222, and 422 may each include and/or contain versions 1, 2, and 3. The term "version," as used herein, generally refers to any type or form of increment, delta, and/or differential of data that is layered on top of other data previously replicated from a virtual disk. Accordingly, versions 1, 2, and 3 of virtual disk 220 may collectively constitute and/or form the most up-to-date representation of virtual disk 220. Similarly, versions 1, 2, and 3 of virtual disk 422 may collectively constitute and/or form the most up-to-date representation of virtual disk 422.

Figure 5:
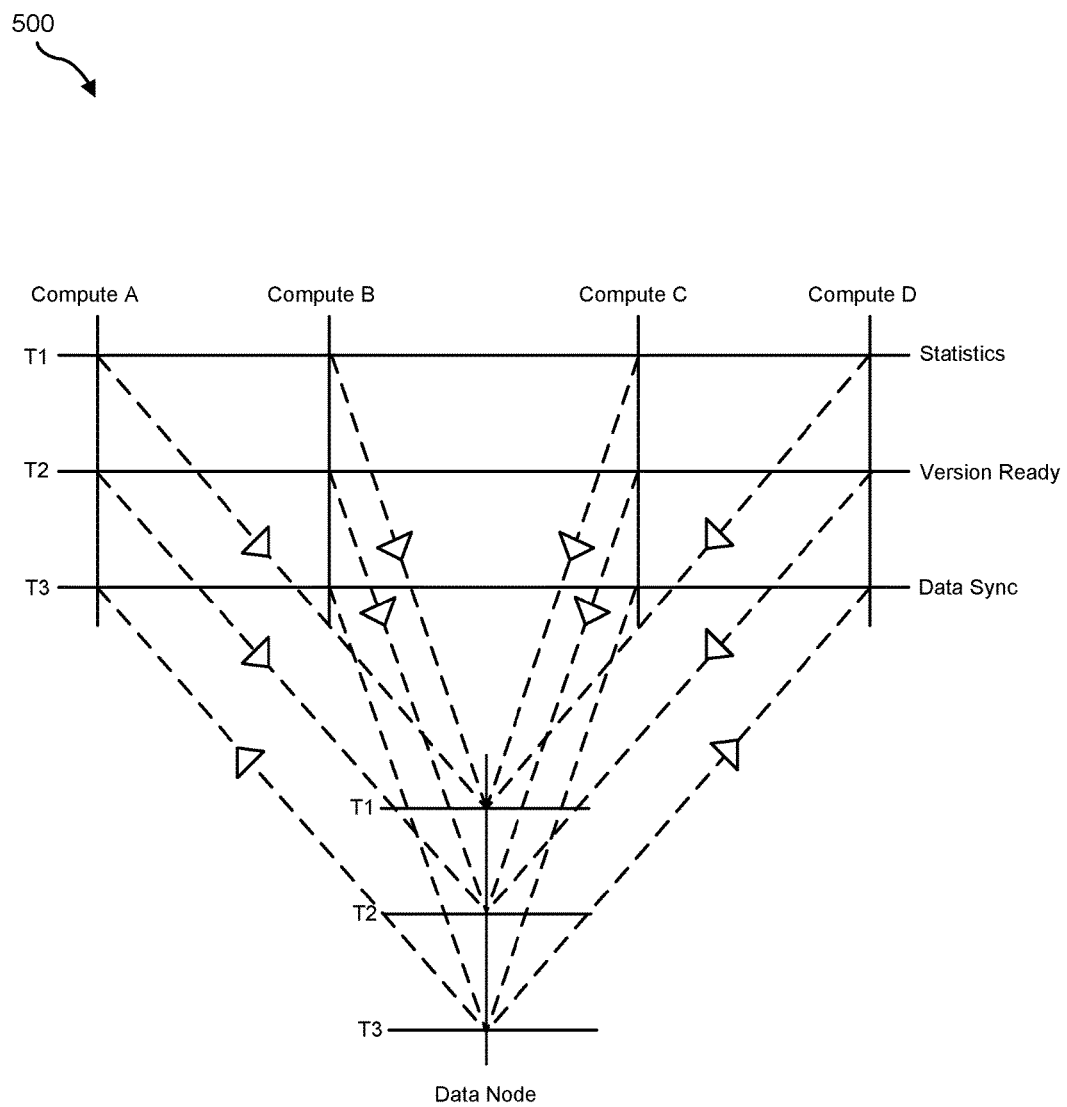
FIG. 5 is a timing diagram of an example data replication process directed by a data node within a distributed cluster environment.

FIG. 5 is a timing diagram of an example data replication process 500. As illustrated in FIG. 5, data replication process 500 may involve a series of steps performed at times T1, T2, and T3. For example, at time T1, compute nodes A, B, C, and D may each send reporting statistics to the data node. At time T2, compute nodes A, B, C, and D may each initiate and/or send to the data node a message indicating that a version of a virtual disk is ready for data replication and/or to be synced with the data node. After reviewing and/or comparing the reporting statistics from compute nodes A, B, C, and D, the data node may rank the compute nodes in order of priority based at least in part on their respective data replication and/or storage needs.

In one example, the data node may rank compute node A as having the highest priority and compute node D as having the second highest priority. Accordingly, the data node may rank compute node B as having the lowest priority and compute node C as having the second lowest priority. In this example, the data node may have a maximum write speed of approximately 1.6 gigabytes per second. In addition, compute nodes A and C may each have a transfer and/or data-sync rate of approximately 900 megabytes per second.

Compute node B may have a transfer and/or data-sync rate of approximately 1 gigabyte per second, and compute node D may have a transfer and/or data-sync rate of approximately 700 megabytes per second.

Continuing with this example, since (1) compute nodes A and D have the highest priorities and (2) the sum of their transfer and/or data-sync rates is less than or equal to the data node's maximum write speed, the data node may direct both of compute nodes A and D to perform data replication processes and/or data syncs simultaneously. As a result, at time T3, the data node may send to compute nodes A and D an acknowledgment of their respective version-ready messages such that compute nodes A and D initiate their respective data replication processes and/or data syncs. This acknowledgment may cause compute nodes A and D to simultaneously perform their respective data replication processes and/or data syncs with the data node.

Figure 6:
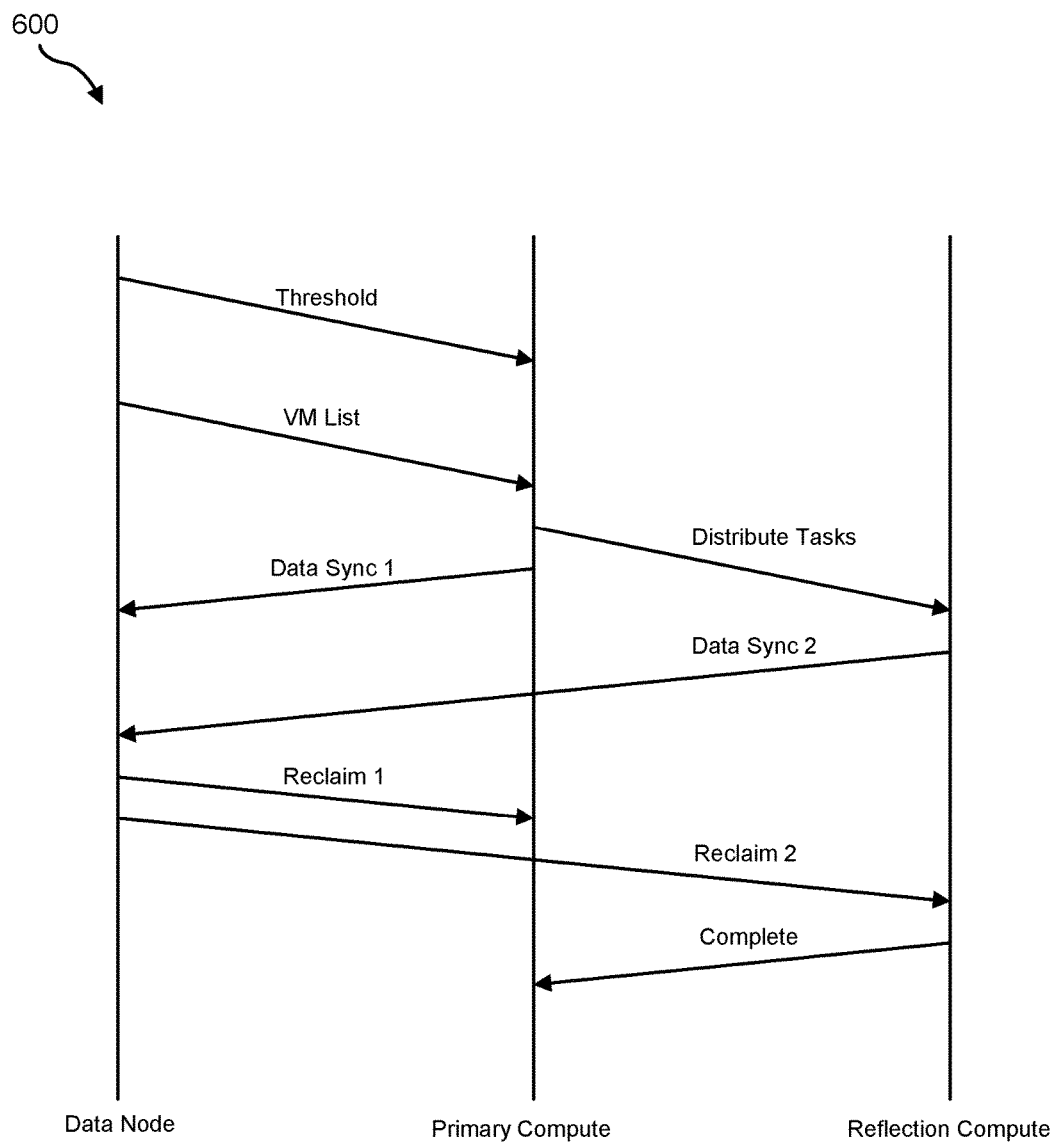
FIG. 6 is a timing diagram of an example aggressive data replication job directed by a data node within a distributed cluster environment.

FIG. 6 is a timing diagram of an example aggressive data replication job 600. As illustrated in FIG. 6, aggressive data replication job 600 may involve a series of steps performed at different times that facilitate syncing each virtual disk within a virtual machine with a data node. For example, a data node may identify the amount of SSD storage space that is occupied by data from a virtual machine running on a primary compute node. In this example, the data node may determine that this amount of data has reached and/or exceeded a certain threshold. In response, the data node may send a Virtual Machine (VM) list to the primary compute node. This VM list may include and/or identify the virtual machine whose data has reached and/or exceeded the threshold amount.

Upon receiving the VM list, the primary compute node may begin syncing one of the virtual disks contained in that virtual machine with the data node. The primary compute node may also distribute certain data replication tasks to a reflection compute node that includes and/or stores reflected and/or mirrored copies of all virtual disks contained in that virtual machine. The reflection compute node may then begin syncing another one of the virtual machines contained in that virtual machine with the data node based at least in part on these data replication tasks.

As a specific example in connection with FIG. 4, data node 206 may send a VM list that includes and/or identifies virtual machine 210 to compute node 202(1)). In this example, virtual machine 210 may include and/or contain virtual disks 220 and 420. In response to receiving the VM list, compute node 202(1)) may begin replicating the most up-to-date version of virtual disk 220 to data node 206. Compute node 202(1)) may also distribute certain data replication tasks to compute node 202(2). These data replication tasks may involve replicating virtual disk 420 to data node 206. Compute node 202(2) may then replicate the most up-to-date version of virtual disk 420 to data node 206 based at least in part on those data replication tasks distributed by compute node 202(1)).

Alternatively, aggressive data replication job 600 may involve a series of steps performed at different times that facilitate syncing each virtual machine running on a compute node with a data node. For example, a data node may identify the amount of SSD storage space that is occupied by data from multiple virtual machines running on a primary compute node. In this example, the data node may determine that this amount of data has reached and/or exceeded a certain threshold. In response, the data node may send a VM list to the primary compute node. This VM list may include and/or identify all of the virtual machine whose data has contributed to the amount of SSD storage space reaching and/or exceeding the threshold.

Upon receiving the VM list, the primary compute node may begin syncing one of the virtual machines with the data node by replicating each virtual disk within that virtual machine to the data node. The primary compute node may also distribute certain data replication tasks to a reflection compute node that includes and/or stores reflected and/or mirrored copies of all virtual disks contained in another one of the virtual machines. The reflection compute node may then begin syncing that other virtual machine with the data node by replicating each virtual disk within that other virtual machine based at least in part on these data replication tasks.

By coordinating their data replication and/or syncing efforts in this way, the primary compute node and the reflection compute node may be able to achieve data replication and/or synchronization faster, thereby ensuring that the primary compute node's SSD does not overflow and/or cause any data corruption, SLA violations, and/or application downtime. As a result, the primary compute node may achieve greater performance and/or reliability in its distributed cluster environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing data replication in distributed cluster environments, at least a portion of the method being performed by a computing device comprising at least one processor, the method comprising:
   identifying a distributed cluster environment that includes:
      a plurality of compute nodes that execute a plurality of virtual machines;
      at least one data node that stores data that has been replicated from storage devices used by the virtual machines;
   determining, at the data node, storage-utilization totals for the virtual machines that represent amounts of storage space on the storage devices used by the virtual machines;
   identifying, based at least in part on the storage-utilization totals, a virtual machine whose storage-utilization total is highest among the plurality of virtual machines;
   prioritizing the virtual machine with the highest storage-utilization total among the plurality of virtual machines;
   in response to the prioritization, directing the compute node that executes the virtual machine with the highest storage-utilization total to initiate a data replication process with the data node in connection with the virtual machine;
   identifying a transfer-rate total that represents a sum of all data replication processes being performed by the plurality of compute nodes on the data node;
   determining that the transfer-rate total exceeds a maximum write speed of the data node;
   in response to determining that the transfer-rate total exceeds the maximum write speed of the data node, directing the compute node that executes the virtual machine with the highest storage-utilization total to initiate an aggressive data replication job that involves multiple compute nodes contributing to the data replication process, wherein the compute node performs the aggressive data replication job in conjunction with another compute node that is storing a reflected copy of the data implicated in the aggressive data replication job.

2. The method of claim 1, further comprising:
   collecting, from the virtual machines, statistics that identify the storage-utilization totals used by the virtual machines;
   calculating the storage-utilization totals for the virtual machines based at least in part on the statistics collected from the virtual machines.

3. The method of claim 1, wherein:
   prioritizing the virtual machine with the highest storage-utilization total comprises scheduling a plurality of data replication processes for the virtual machines in order of the highest storage-utilization total to the lowest storage-utilization total among the virtual machines;
   directing the compute node that executes virtual machine with the highest storage-utilization total to initiate the data replication process comprises directing the compute nodes to initiate the data replication processes as scheduled in the order of the highest storage-utilization total to the lowest storage-utilization total.

4. The method of claim 3, wherein directing the compute nodes to initiate the data replication processes as scheduled in the order of the highest storage-utilization total to the lowest storage-utilization total comprises, upon completion of the data replication process, directing another compute node to initiate another data replication process with the data node in connection with another virtual machine running on the other compute node.

5. The method of claim 1, wherein directing the compute node that executes virtual machine with the highest storage-utilization total to initiate the data replication process comprises enabling the compute node to reclaim storage space on one of the storage devices previously occupied by data that has been replicated to the data node during the data replication process.

6. The method of claim 1, wherein directing the compute node that executes the virtual machine to perform the aggressive data replication job in conjunction with the other compute node comprises interrupting another data replication process in progress to enable the compute node and the other compute node to perform the aggressive data replication job.

7. The method of claim 1, wherein:
the aggressive data replication job involves replicating multiple virtual disks to the data node;
directing the compute node to perform the aggressive data replication job in conjunction with the other compute node comprises directing the compute node to:
replicate one of the multiple virtual disks to the data node;
distribute at least one task to the other compute node that causes the other compute node to replicate another one of the multiple virtual disks to the data node such that the compute node and the other compute node are replicating the multiple virtual disks to the data node simultaneously.

8. The method of claim 7, wherein directing the compute node to replicate the one of the multiple virtual disks and distribute the task to the other compute node comprises:
enabling the compute node to reclaim storage space on one of the storage devices previously occupied by data that has been replicated to the data node during the aggressive data replication job;
enabling the compute node to reclaim storage space on another one of the storage devices previously occupied by data that has been replicated to the data node during the aggressive data replication job.

9. The method of claim 1, wherein the storage devices comprise at least one Solid-State Drive (SSD).

10. A system for performing data replication in distributed cluster environments, the system comprising:
an identification module, stored in memory, that identifies a distributed cluster environment that includes:
a plurality of compute nodes that execute a plurality of virtual machines;
at least one data node that stores data that has been replicated from storage devices used by the virtual machines;
a determination module, stored in memory, that determines storage-utilization totals for the virtual machines that represent amounts of storage space on the storage devices used by the virtual machines;
wherein the identification module further identifies, based at least in part on the storage-utilization totals, a virtual machine whose storage-utilization total is highest among the plurality of virtual machines;
a scheduling module, stored in memory, that:
prioritizes the virtual machine with the highest storage-utilization total among the plurality of virtual machines;
directs, in response to the prioritization, the compute node that executes the virtual machine with the highest storage-utilization total to initiate a data replication process with the data node in connection with the virtual machine;
wherein the identification module further identifies a transfer-rate total that represents a sum of all data replication processes being performed by the plurality of compute nodes on the data node;
wherein the determination module further determines that the transfer-rate total exceeds a maximum write speed of the data node;
wherein the scheduling module directs, in response to the determination that the transfer-rate total exceeds the maximum write speed of the data node, the compute node that executes the virtual machine with the highest storage-utilization total to initiate an aggressive data replication job that involves multiple compute nodes contributing to the data replication process, wherein the compute node performs the aggressive data replication job in conjunction with another compute node that is storing a reflected copy of the data implicated in the aggressive data replication job;
at least one physical processor that executes the identification module, the determination module, and the scheduling module.

11. The system of claim 10, further comprising:
a collection module, stored in memory, that collects, from the virtual machines, statistics that identify the storage-utilization totals used by the virtual machines;
the determination module further calculates the storage-utilization totals for the virtual machines based at least in part on the statistics collected from the virtual machines.

12. The system of claim 10, wherein the scheduling module further:
schedules a plurality of data replication processes for the virtual machines in order of the highest storage-utilization total to the lowest storage-utilization total among the virtual machines;
directs the compute nodes to initiate the data replication processes as scheduled in the order of the highest storage-utilization total to the lowest storage-utilization total.

13. The system of claim 12, wherein the scheduling module directs, upon completion of the data replication process, another compute node to initiate another data replication process with the data node in connection with another virtual machine running on the other compute node.

14. The system of claim 10, wherein the scheduling module enables the compute node to reclaim storage space on one of the storage devices previously occupied by data that has been replicated to the data node during the data replication process.

15. The system of claim 10, wherein the scheduling module interrupts another data replication process in progress to enable the compute node and the other compute node to perform the aggressive data replication job.

16. A non-transitory computer-readable medium comprising one or more computer-executable instructions that, when executed by at least one processor of a computing device, cause the computing device to:
identifies a distributed cluster environment that includes:
a plurality of compute nodes that execute a plurality of virtual machines;

at least one data node that stores data that has been replicated from storage devices used by the virtual machines;

determines, at the data node, storage-utilization totals for the virtual machines that represent amounts of storage space on the storage devices used by the virtual machines;

identifies, based at least in part on the storage-utilization totals, a virtual machine whose storage-utilization total is highest among the plurality of virtual machines;

prioritizes the virtual machine with the highest storage-utilization total among the plurality of virtual machines;

directs, in response to the prioritization, the compute node that executes the virtual machine with the highest storage-utilization total to initiate a data replication process with the data node in connection with the virtual machine;

identifies a transfer-rate total that represents a sum of all data replication processes being performed by the plurality of compute nodes on the data node;

determines that the transfer-rate total exceeds a maximum write speed of the data node;

directs, in response to determining that the transfer-rate total exceeds the maximum write speed of the data node, the compute node that executes the virtual machine with the highest storage-utilization total to initiate an aggressive data replication job that involves multiple compute nodes contributing to the data replication process, wherein the compute node performs the aggressive data replication job in conjunction with another compute node that is storing a reflected copy of the data implicated in the aggressive data replication job.

* * * * *